United States Patent

Nakamura et al.

[11] Patent Number: 5,898,875
[45] Date of Patent: Apr. 27, 1999

[54] METHOD AND COMPUTER SYSTEM FOR LOADING OBJECTS

[75] Inventors: Hiroaki Nakamura, Yamato; Tamiya Onodera, Tokyo-to; Mikio Takauchi, Zama, all of Japan

[73] Assignee: International Business Machines Corp., Armonk, N.Y.

[21] Appl. No.: 08/666,764

[22] Filed: Jun. 19, 1996

[30] Foreign Application Priority Data

Jul. 20, 1996 [JP] Japan .................................... 7-183776

[51] Int. Cl.⁶ .................................................. G06F 9/495
[52] U.S. Cl. ........................................................ 395/712
[58] Field of Search ............................................ 395/712

[56] References Cited

U.S. PATENT DOCUMENTS 5,265,206  11/1993  Shackelford ........................... 395/200

OTHER PUBLICATIONS

Antony L. Hosking and J. Elliot B. Moss, "Object Fault Handling for Persistent Programming Languages: A Performance Evaluation", OOPSLA '93 pp. 288–303 1993.

Antony L. Hosking and J. Eliot B. Moss, "Object Fault Handling for Persistnt Programming Languages: A Performance Evaluation", Proceedings of Object Oriented Programming Systems and Languages 1993 ACM.

*Primary Examiner*—Tariq R. Hafiz
*Assistant Examiner*—Lisa Stevens
*Attorney, Agent, or Firm*—A. Bruce Clay

[57] ABSTRACT

An objects loading method comprising the steps of (1) determining whether an object which is going to be loaded is a first object which is accessed only by another object, (2) if the object which is going to be loaded is determined to be the first object, removing the first object and also at least one second object which is accessed by the first object from the objects to be loaded, and (3) updating a list for managing the loaded objects.

6 Claims, 4 Drawing Sheets

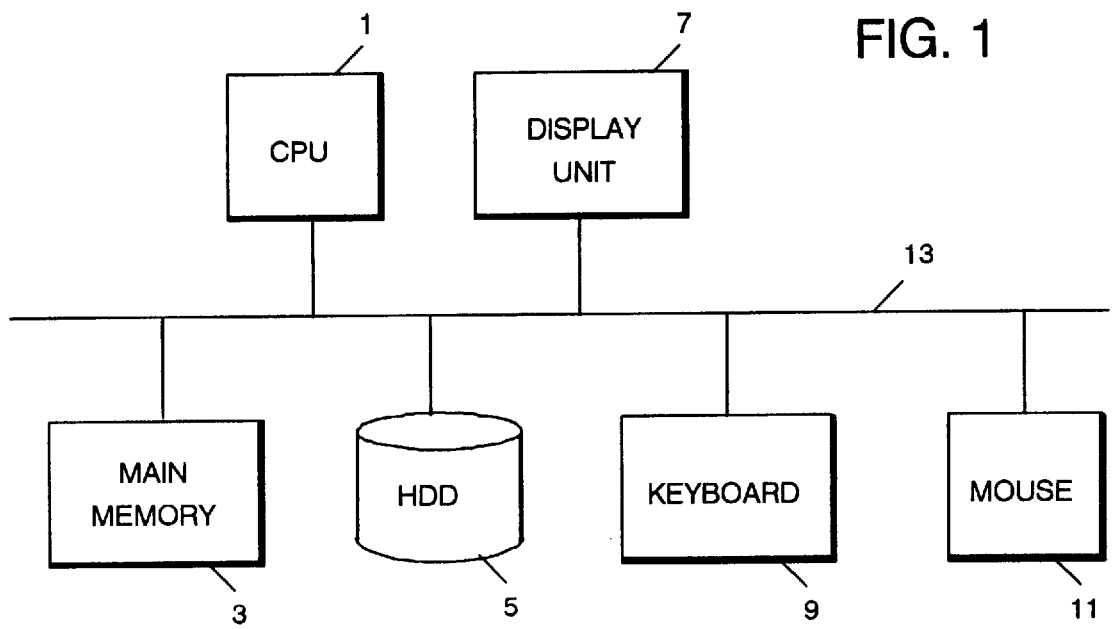
FIG. 1
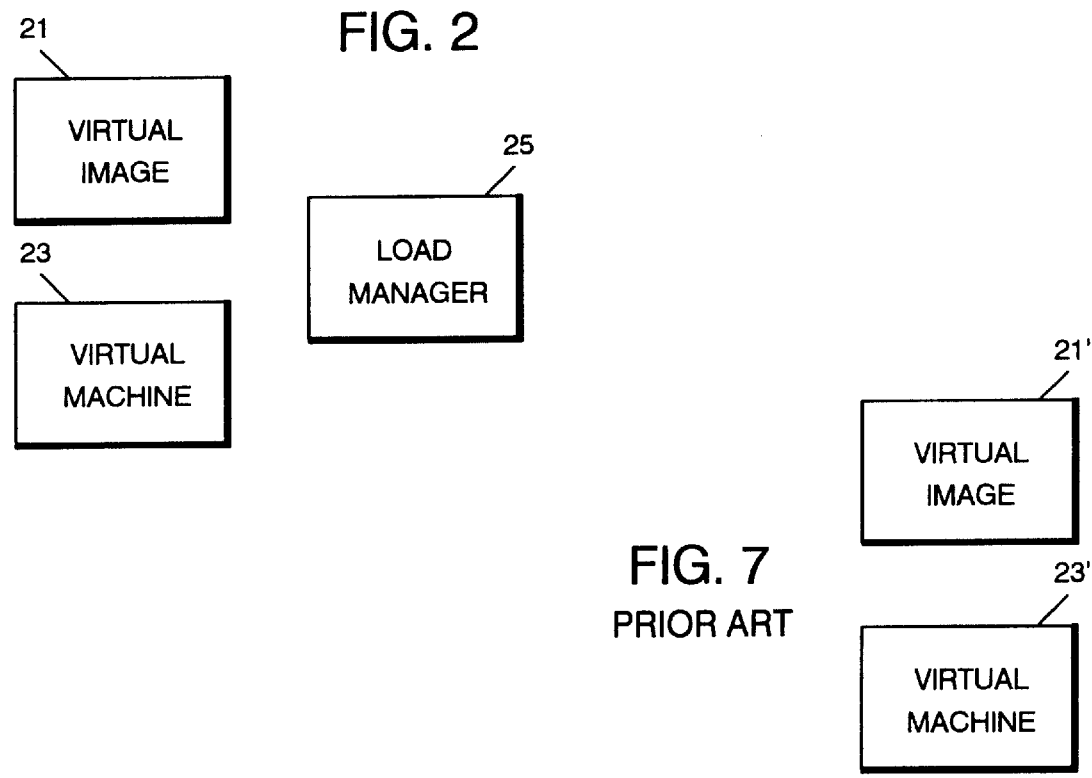
FIG. 2
FIG. 7
PRIOR ART

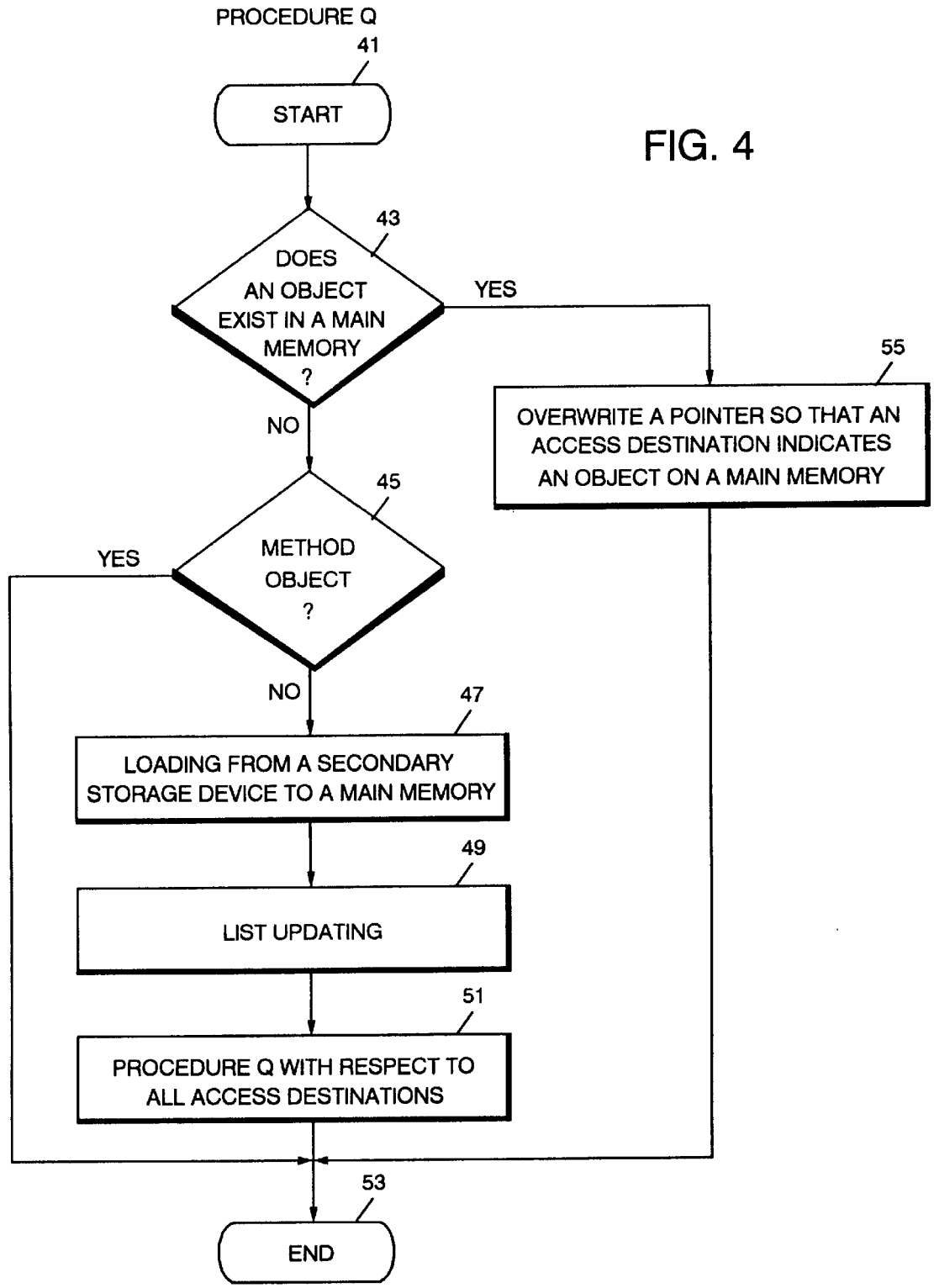

METHOD AND COMPUTER SYSTEM FOR LOADING OBJECTS

FIELD OF THE INVENTION

The present invention relates to a method for loading objects of an object-oriented program into a main memory of a computer system from a secondary storage device of the system, and more particularly to a method for loading a method object in a Smalltalk program language processing system into a main memory of a computer system from the secondary storage device of the system.

BACKGROUND OF THE INVENTION

The Smalltalk program language processing system is constituted by a virtual image and a virtual machine, as shown in FIG. 7. The virtual image is code in which data, programs, executive contexts, and the like are expressed as objects, and is formed by compiling and running a program written in Smalltalk language. The virtual machine, on the other hand, is a section which interprets the instructions of the virtual image and instructs a computer (CPU) to operate on the data of the virtual image.

The virtual image includes development environments and objects needed for executing other application programs, and consequently, the virtual image may become too large. Even when only a specific application program is executed, the start time is long because the entire virtual image is constituted. Also, since the virtual image requires a large part of the memory, the locality of the program is poor and cache misses and pagings are frequently caused.

To cope with these problems, there has been proposed a method in which objects necessary for a specific application are extracted and stored, and the objects are utilized as a virtual image. For example, there is the stripper of Visual Works (ParcPlace Systems), the library builder of Visual Smalltalk (Digitalk), and the minimum image generation function of VisualAge (IBM). When a virtual image for a specific application is extracted in advance, the following disadvantages occur: (1) since the automatic analysis of a meta program such as the program with a method object taking a message as an argument is impossible, human interaction is indispensable to the extraction of the image, and consequently, there is the possibility that mistakes are caused; (2) the object-oriented language has the nature that parts of a program to be executed are unpredictable in advance and in fact a large part of the program has to be included in the virtual image, so the virtual image cannot be made dramatically small; and (3) since the whole image needed for executing an application program is read into the main memory when the program is started, the start time is lengthy.

In another method, necessary objects are not loaded into a main memory until they become necessary (for example, Ted Kaehler and Glenn Krasner, "LOOM-Large Object-Oriented Memory for Smalltalk-80 System, Smalltalk-80 Bits of History Words of Advice," Addison-Wesley, 1983). The system disclosed therein is a method obliged to be taken because the capacity of a main memory is physically small, but it is necessary to execute a large-scale application. Also, when access to an object occurs, main memory is checked every time to see if the object exists thereon; thus, there is the disadvantage that the residency check is heavy. Furthermore, there is Antony L. Hosking and J. Eliot B. Moss, "Object Fault Handling for Persistent Programming Languages: A performance Evaluation, Proceedings of Object Oriented Programming Systems and Languages," ACM 1993." This method loads a Smalltalk object into main memory when it is needed. Even in this case, the method of loading objects is the same as that disclosed in the aforementioned publication.

Moreover, IBM TDB vol. 37, No. 2A, pp. 257–260, February 1994, discloses that a method using dynamic link library (DLL) is used in the Smalltalk system. This method is also constructed so that objects are linked at the time of execution, but since a target object has to be extracted from a virtual image in advance, this method is the same as the aforementioned conventional examples and therefore has the following disadvantages: (1) the extracting operation is complicated; (2) objects are loaded in units of class and, therefore, the virtual image cannot be made small; and (3) since at least the entire symbol table needs to be loaded in when linking is performed, it takes time.

Thus, a wide variety of methods have been employed in order to make the virtual image small. None of the known methods can make the image sufficiently smaller and the load thus caused is too great.

Accordingly, an objective of the present invention is to reduce the number of objects which are loaded into a main memory without requiring users to perform any operation. Another objective is to reduce the amount of use of the main memory and improve the locality of a program. Still another objective is that the start of a program can be performed at high speeds. A further objective is to minimize a reduction in operational performance caused by loading objects.

SUMMARY OF THE INVENTION

To achieve the foregoing objectives, the present invention executes the following steps in a computer system loading an object-oriented program including a plurality of objects into a main memory of the computer system from a secondary storage device of the computer system to run the program. That is, the invention comprises the step of: (a) loading the objects from a root object of the plurality of objects into said main memory; the loading step (a) including the sub-steps of: (a1) determining whether or not an object which is going to be loaded is a first object which is accessed only by another object; (a2) if it is determined that the object which is going to be loaded is the first object, removing the first object and at least one second object which is accessed by the first object from the objects to be loaded; and (a3) updating a list for managing the loaded objects. With this, the start of the program can be executed at high speeds.

Also, the present invention further comprises the steps of (b) detecting an access to the first object; (c) checking the list, and determining whether or not the first object has already been loaded; (d)if it is determined that the first object has not been loaded yet, loading the first object and at least one second object; and (e) updating the list. With this, the number of objects which are loaded into the main memory can be reduced without requiring users to perform any operation. Furthermore, the load caused by loading is small.

In addition, the aforementioned loading step (a) may further comprise the steps of checking the list, and determining whether or not an object which is going to be loaded has already been loaded; and if it is determined that said object which is going to be loaded has already been loaded, removing the already loaded object from the objects to be loaded.

Furthermore, the aforementioned step (d) may include the sub-steps of loading said first object; determining an object among said second objects which has been already loaded by using the list; and removing the object which is determined to have already been loaded by the determining step from the objects to be loaded.

Moreover, this invention may further comprise the step of changing an access destination of a source object accessing to said already loaded object to an address on the main memory.

In the case of the Smalltalk, the first object which is accessed only by another object is a method object. With this, the aforementioned objectives can be sufficiently achieved.

In other words, a computer system loads an object-oriented program including a plurality of objects into main memory from a secondary storage device to run the program. Means are provided for initially loading objects into said main memory other than a method object and an object accessed by the method object of the plurality of objects; and, means are provided for loading the method object and the object accessed by the method object when an access to the method object is detected.

BRIEF DESCRIPTION OF THE DRAWINGS

For a more complete understanding of the present invention and for further advantages thereof, reference is now made to the following Detailed Description taken in conjunction with the accompanying Drawings, in which:

FIG. 1 is a block diagram showing an example of equipment for utilizing the present invention;

FIG. 2 is a block diagram showing the constitution of the main memory;

FIG. 4 is a flowchart showing the steps executed when loading a program and a method object;

FIG. 7 is a block diagram showing the constitution of a conventional main memory in a Smalltalk language processing system.

DETAILED DESCRIPTION OF THE INVENTION

Figure 3:
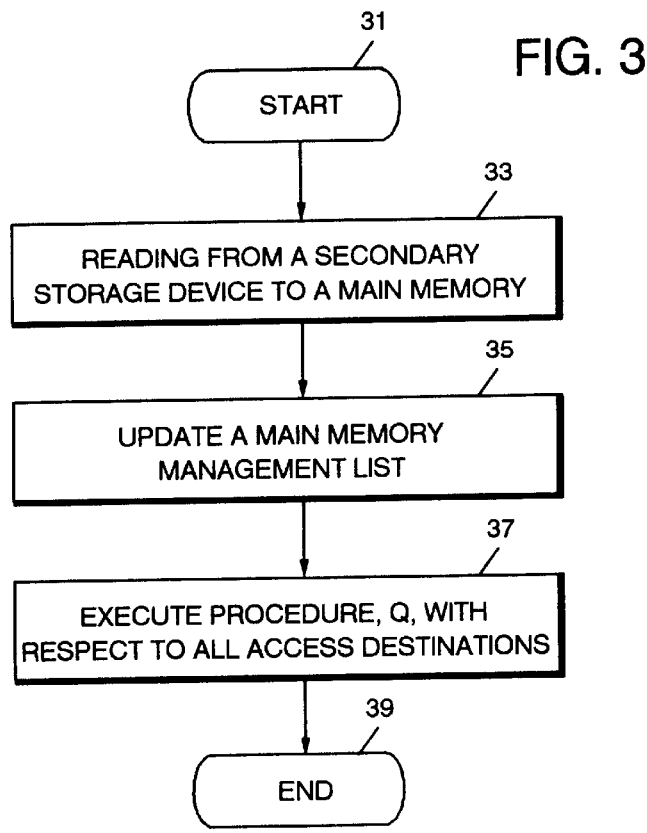
FIG. 3 is a flowchart showing the steps executed when loading a program.

FIG. 1 shows an example of a Smalltalk language processing system in an embodiment of the present invention. A central processing unit (CPU) 1, a main memory 3, a hard-disk drive (HDD) which is a secondary storage device, a display unit 7 displaying a result of processing to a user, and a keyboard 9 and a mouse 11 which are input equipment, are connected to a bus 13. As described above, objects have been stored in the HDD 5 and are loaded into the main memory 3 so that the objects are executed at the CPU 1. The part corresponding to the virtual machine has also been stored in the HDD 5 or a ROM or RAM and is loaded to the main memory 3. This system can add a tape drive unit, a sub-storage device such as a floppy disk drive (FDD), or an output unit such as a printer. The system can also be connected to a network such as a local area network (LAN).

Next, the constitution of the main memory 3 of the system shown in FIG. 1 is shown in FIG. 2. As with the prior art as shown in FIG. 7, the main memory 3 comprises a virtual machine 23 and a virtual image 21. In fact, although means for loading objects is provided even in the prior art, in the present invention a load manager 25 is particularly shown because it plays a main role in the loading of the objects into the main memory 3. This load manager 25 can also be considered to be part of the virtual machine 23.

While the operation of this load manager 25 will hereinafter be described, an object will now be briefly described. An object has data and a method which is a procedure for accessing the data.

The method is executed by sending a message. An object storing information needed for executing this method is referred to as a context. The context comprises a method object having the context and the program of a call destination, a program counter, and a stack pointer. This method object is relatively large in size and is accessed only by a single method dictionary object. The present invention achieves the aforementioned objectives by making use of this nature of the method object. That is, if the loading of the method object is delayed, the number of objects to be loaded at the time of the start of a program will be reduced and therefore the loading time will be shortened. Furthermore, since the method object is accessed only by another object, the determination of whether the method object is loaded is needed only when another object accesses the method object. Therefore, as compared with a method where a determination must always be made when a message is sent, cost required for the determination is small. Note that the method dictionary object is a sort of list retrieving a storage position from the name of a method.

(1) When Starting a Program

The operation as a program is started is shown in FIGS. 3 and 4. The root object of the program is first loaded. That is, the root object is loaded from the secondary storage device (for example, HDD 5) to the main memory 3 (step 33). At this time, a main memory management list is generated (step 35). This main memory management list records the object loaded into the main memory so that the address of the object loaded into the main memory corresponds to the address of the object in the secondary storage device. Whether an object has been loaded can be determined by referring to this list. Procedure Q is performed with respect to all access destinations of this root object. This procedure Q is shown in FIG. 4.

The procedure Q first checks if an object exists in the main memory (step 43). This check is performed using the aforementioned main memory management list. If the object is an object listed in this list, the pointer of the source object will be written over so that it won't indicate an object on the secondary storage device but rather an object on the main memory (step 55). If, on the other hand, the object is not on the main memory, it is determined whether the destination object (accessed object) is a method object (step 45). Since a method object is accessed only by a single method dictionary object, as previously stated, the determining step can be omitted if this method dictionary object is the source object. However, since the point of the present invention is that the objects following an object which is accessed only by a single object are not loaded first, the determination of whether a destination object is a method object will be made. If the destination object is determined to not be a method object, the object will be loaded from the secondary storage device to the main memory 3 (step 47). If the object is loaded to the main memory 3, an item will be added to the aforementioned main memory management list (step 49), and, for this object, the procedure Q is executed with respect to all of the destination objects. If in step 45 the object is determined to be a method object, the operation will return to step 37 (FIG. 3) and the next destination will be processed.

Figure 5:
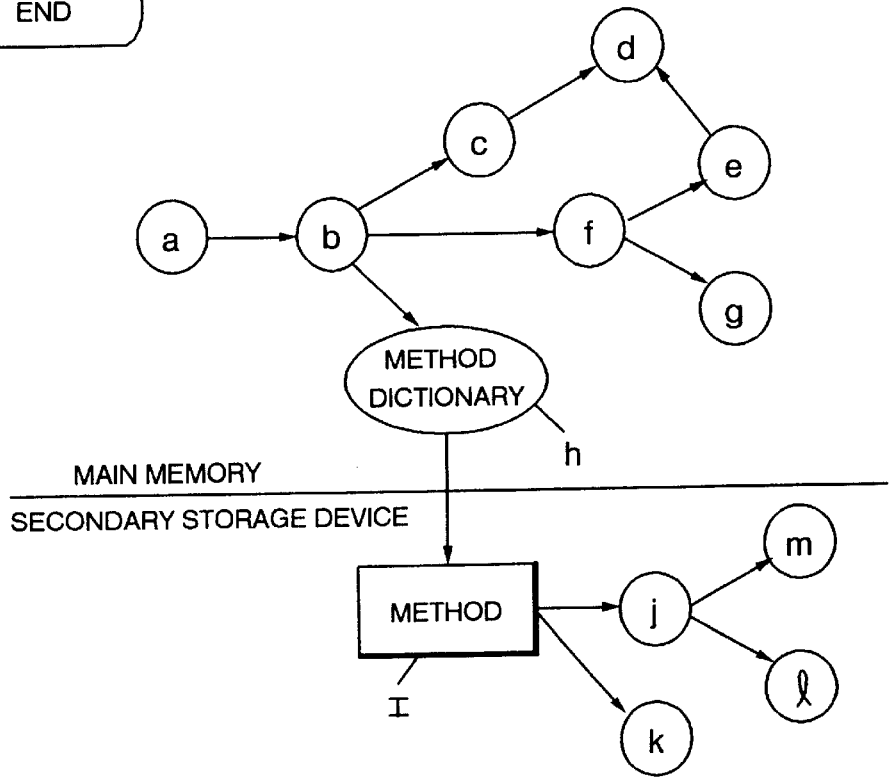
FIG. 5 is a diagram showing an example of the constitution of the objects.

The above-described operation will now be described with an example as shown in FIG. 5. In the FIG. 5, an object a is a root object. This object a is first loaded (step 33). Then, the address of the object a in the secondary storage device and also the address of the object a in the main memory where the object was loaded are written to the main memory management list (step 35). Then, in step 37 the object b of the access destination is processed. Since at first the object b has also not been loaded, step 43 shifts to step 45. Since the object b is not a method object, it is loaded from the secondary storage device to the main memory (step 47). Then, the object b is also added to the main memory management list (step 49).

The procedure Q is carried out for the object b (step 51). The access destination of the object b is an object c, an object f, and a method dictionary object h. As aforementioned, the object c is loaded to the main memory and added to the main memory management list. Then the procedure Q is carried out for the object c. The access destination of the object c is an object d. This object d is also loaded to the main memory and added to the main memory management list. The processing for the object c which is the access destination of the object b completes.

Now, the operation returns to the object f that the object b accesses. This object f is likewise loaded to the main memory and added to the main memory management list. The access destination of the object f is objects e and g. The objects e and g are loaded to the main memory and added to the main memory management list. However, since the object d, which is the access destination of the object e is the access destination of the aforementioned object c, the object d has already been loaded to the main memory. Therefore, the destination of he pointer of the object e to the object d is overwritten from the address of the secondary storage device to an address on the main memory. This overwriting is performed by referring to the main memory management list. As previously stated, the main memory management list records the addresses in the secondary storage device and the addresses in the main memory so that they correspond to each other. Therefore, if an address of the access destination in the secondary storage device exists in the main memory management list, the address in the main memory can be retrieved from the list and therefore steps 43 and 55 can be executed by a sequence of reference operations of the main memory management list.

Now, the operation returns to the method dictionary object h that the object b accesses. If this method dictionary object h is checked, it will be found to be a method dictionary object. But, since the method dictionary object h is not a method object, it is loaded to the main memory and added to the main memory management list. Then, if a method object i accessed by this method dictionary object h, is checked, in step 45 the operation will shift to an object (not shown in FIG. 5) that the method dictionary object h accesses next, without loading. That is, objects j, k, l, and m following the method object i are not loaded and, consequently, there is no possibility that the objects j, k, l, and m are added to the main memory management list.

In this way, the state shown in FIG. 5 is obtained. For example, if thirteen objects, a to m, shown in FIG. 5 constitute a program being executed, loading of only eight objects in the main memory at the time of start will be enough and, consequently, the loading time at the time of start will be shortened. Also, the size of the virtual image 21 is reduced by the amount of the objects which are not loaded and also the locality of the program in the main memory is improved. In addition, since the size of the method object is relatively large, as described above, a further reduction in size of the virtual image is obtained.

The access to the method object i is performed only by the method dictionary object. Therefore, the determination of whether this method object has to be loaded into the main memory can be made by monitoring only the access from this method dictionary object, and consequently, subsequent processes will become simple.

(2) Access to a Method Object

Figure 6:
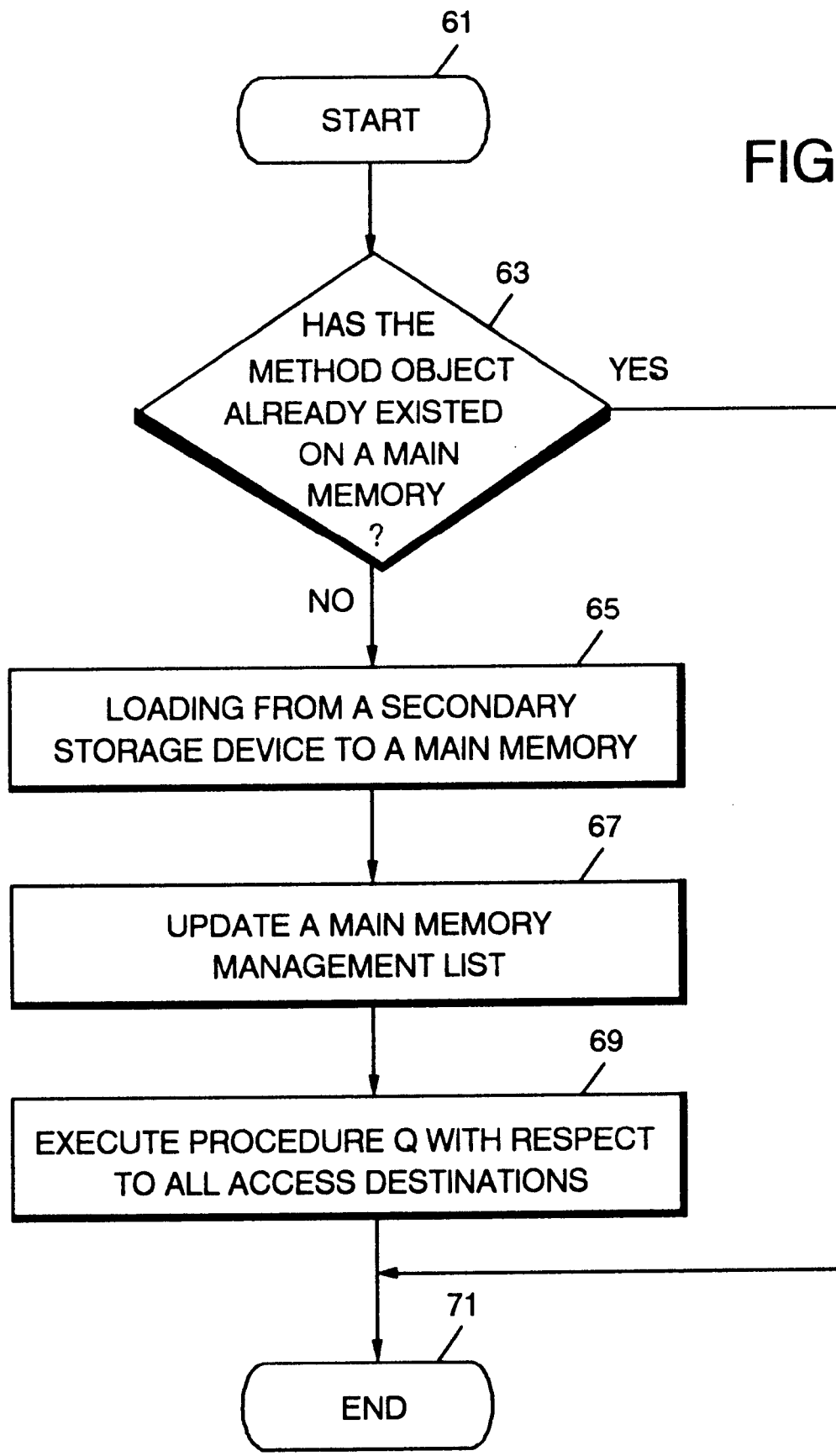
FIG. 6 is a flowchart showing the steps executed when loading a method object.

FIG. 6 shows an access operation to the method object. If the access to the method object is detected, this operation will be started at step 61. As described above, in Smalltalk, access to the method object is performed only by a single method dictionary object. Therefore, when this method dictionary object is accessed and the portion of this method dictionary object, which indicates the method object, is accessed, the operation of FIG. 6 can be made so as to be started. However, in the strict sense of the word, this operation has to be started when a method object is searched by message sending, but in the Smalltalk language processing system, the check of whether the method object exists on the main memory and the loading of the method object are performed only when the result of the search of the method object by the message sending is stored in a method cache and there occurs a cache miss. Since the number of cache misses can also be reduced by carefully designing this method cache, in fact a rate using this procedure by message sending is small, and, therefore, this procedure is not handled in the present invention. Also, since the deign of the method cache does not form part of the present invention, it will not be described further.

If processing is started, then whether the method object has already existed on the main memory will be checked (step 63). This checking is performed using the main memory management list. If the method object is found on the main memory management list, there is no object to be loaded and therefore the operation will be ended (step 71). If, on the other hand, the method object has not been listed in the main memory management list, the method object will be loaded from the secondary storage device (HDD 5) to the main memory 3 (step 65). If the method object is loaded, the main memory management list will be updated because an item has to be added to the main memory management list (step 67), and the procedure Q shown in FIG. 4 is executed for all other objects that the method object accesses.

This procedure Q is performed to prevent two or more method objects from being loaded by a single loading process. In other words, if two or more method objects are loaded in sequence, the number of objects that are loaded at a time will be increased and the load caused by loading will have an influence on other processing. Also, it is preferable to keep the size of the virtual image from rapidly increasing. Therefore, objects which exist until the next method object appears will be loaded, and the next method object and objects following the next method object will be loaded until an access to the next method object occurs.

In the Smalltalk language processing system, the influence of the reduction of the operational performance is minimized because, when the system is used via an interactive programming root, a new method object is accessed and objects following the method object are loaded.

While the embodiment of the present invention has been described, this is solely an embodiment and various modifications are possible. For example, while the virtual machine has been described as software, it is also possible to implement the virtual machine by hardware. In addition, the load manager of the present invention can be implemented by hardware which performs a similar operation. Furthermore, while in the foregoing description the objects have been all loaded in the main memory, a virtual storage mechanism can also be used after loading the objects into the main memory. In the Smalltalk language processing system there has been shown the mechanism where, for an object which is accessed only by a single object, the access to the object is detected and then the object is loaded; however, this mechanism is also applicable to other object-oriented language processing systems. While the main memory management list has been used in the aforementioned example, the items of this list can also include object names if the list includes the addresses of objects in the secondary storage device and the addresses of objects in the main memory.

Also, the aforementioned load manager can be stored in a floppy disk, a CD-ROM, or some other optical or magnetic recording media as parts of a computer system. In addition, in a computer system loading an object-oriented program including a plurality of objects stored in a secondary storage device into a main memory to run the program, the load manager may also be constructed so that it includes determining whether an object which is going to be loaded is a first object which is accessed only by another object, if the object which is going to be loaded is determined to be the first object, removing the first object and also at least one second object which is accessed by the first object from objects to be loaded, and updating a list for managing the loaded objects.

In addition, the load manager may also be constructed so that it further includes detecting an access to the first object, checking the list and determining if the first object has already been loaded, if the first object is determined not to have been loaded, loading the first object and the at least one second object, and updating the list.

The invention has been implemented in a Smalltalk language processing system. As a result, the time needed for starting the system was reduced by up to ¼. Also, the object needed for the start and the execution of some bench-mark programs was reduced to ¹⁄₁₅ of the entire virtual image, but a change in operational performance was not observed. The virtual image of this system is originally small, and large advantages are expected to be obtained when the present invention is implemented in a larger-scale program.

As has been described hereinbefore, the number of objects which are loaded into the main memory can be reduced without requiring users to perform any operation. Also, the amount of main memory used can be reduced and the locality of a program can be enhanced. In addition, the start of a program can be performed at high speeds. Finally, a reduction in operational performance caused by loading objects can be minimized.

We claim:

1. A method for loading an object-oriented program including a plurality of objects comprising a root object and dependent objects thereof into a main memory of a computer system from a secondary storage device of said computer system to run said program, comprising the steps of:

prior to loading, determining whether each of said plurality of objects is a first object accessed only by one other object;

keeping any of said plurality of objects determined to be a said first object in said secondary storage device; and updating a list for managing said plurality of objects loaded into said main memory.

2. The method of claim 1, further comprising the step of:

keeping at least one second object accessed by said first object in said secondary storage device.

3. The method as set forth in claim 2, further comprising the steps of:

detecting an access to said first object;

checking said list, and determining whether said first object has already been loaded;

if it is determined that said first object has not been loaded, loading said first object and at least one of said at least one second object; and updating said list.

4. The method as set forth in claim 1, wherein said first object is a method object.

5. The method as set forth in claim 1, wherein a language of said object-oriented program is Smalltalk.

6. A computer system for loading an object-oriented program including a plurality of objects comprising a root object and dependent objects thereof into a main memory of the computer system from a secondary storage device of the computer system to run the program, comprising:

prior to loading, means for determining whether each of said plurality of objects is a first object accessed only by one other object;

means for keeping any of said plurality of objects determined to be a said first object in said secondary storage device; and means for updating a list for managing said plurality of objects loaded into said main memory.

* * * * *